Feb. 11, 1941.  R. H. WILSON  2,231,608
PLANTER
Filed July 2, 1938   3 Sheets-Sheet 1
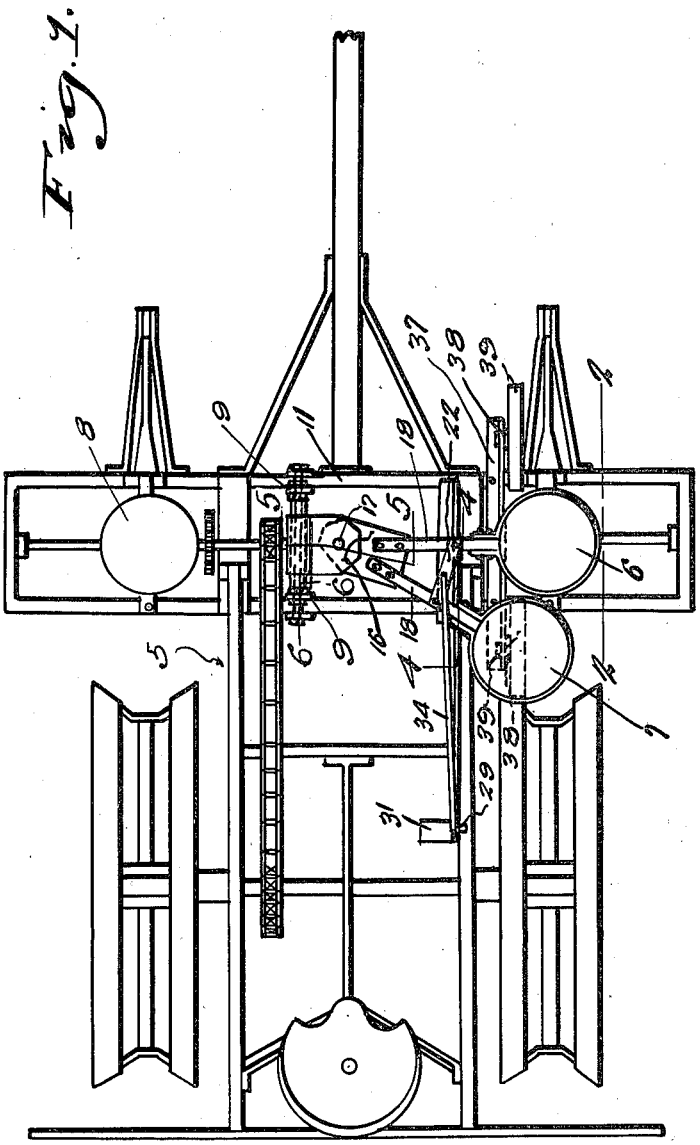
Inventor
Russell H. Wilson
By Clarence A. O'Brien
Hyman Berman
Attorneys

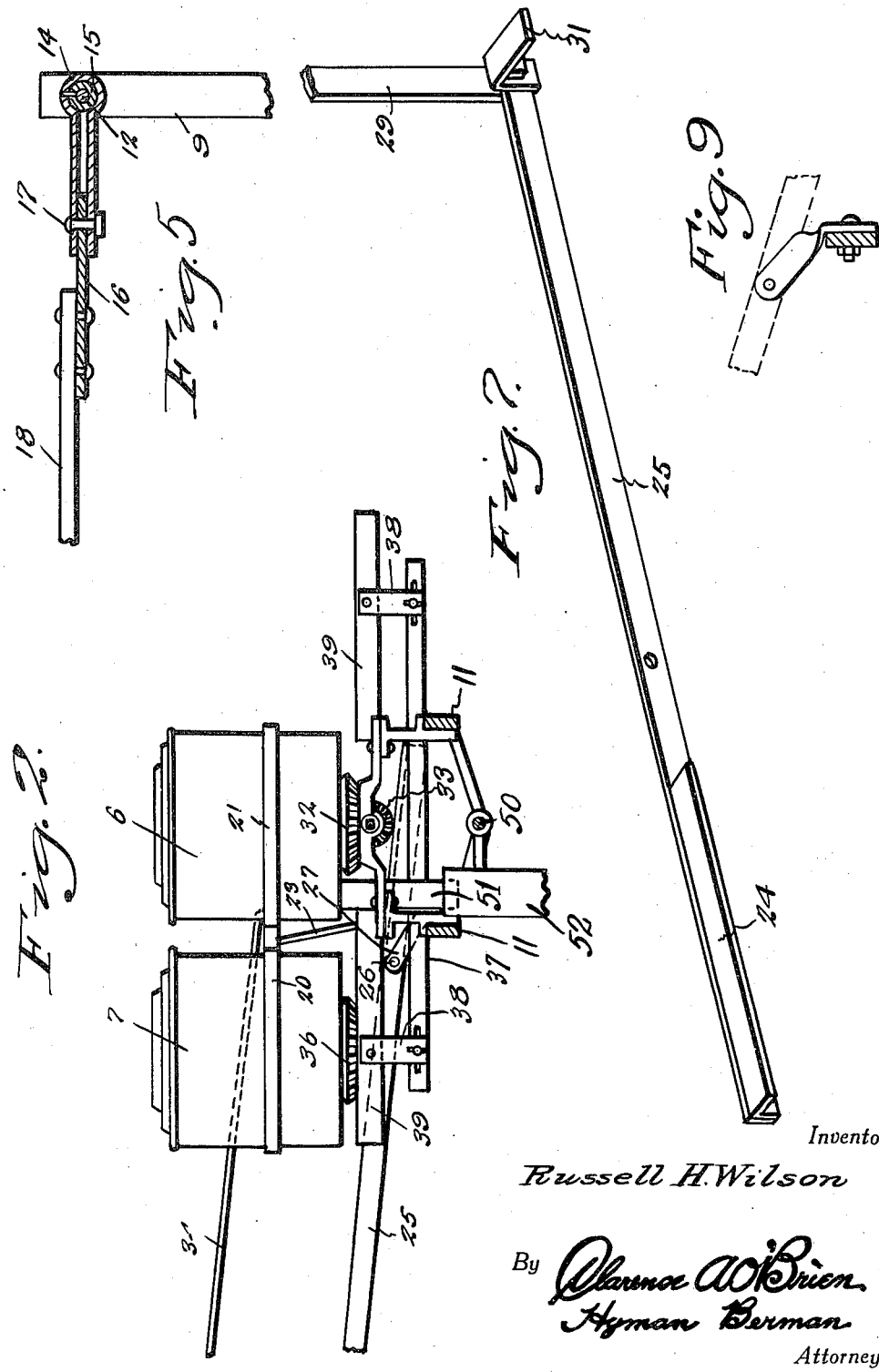

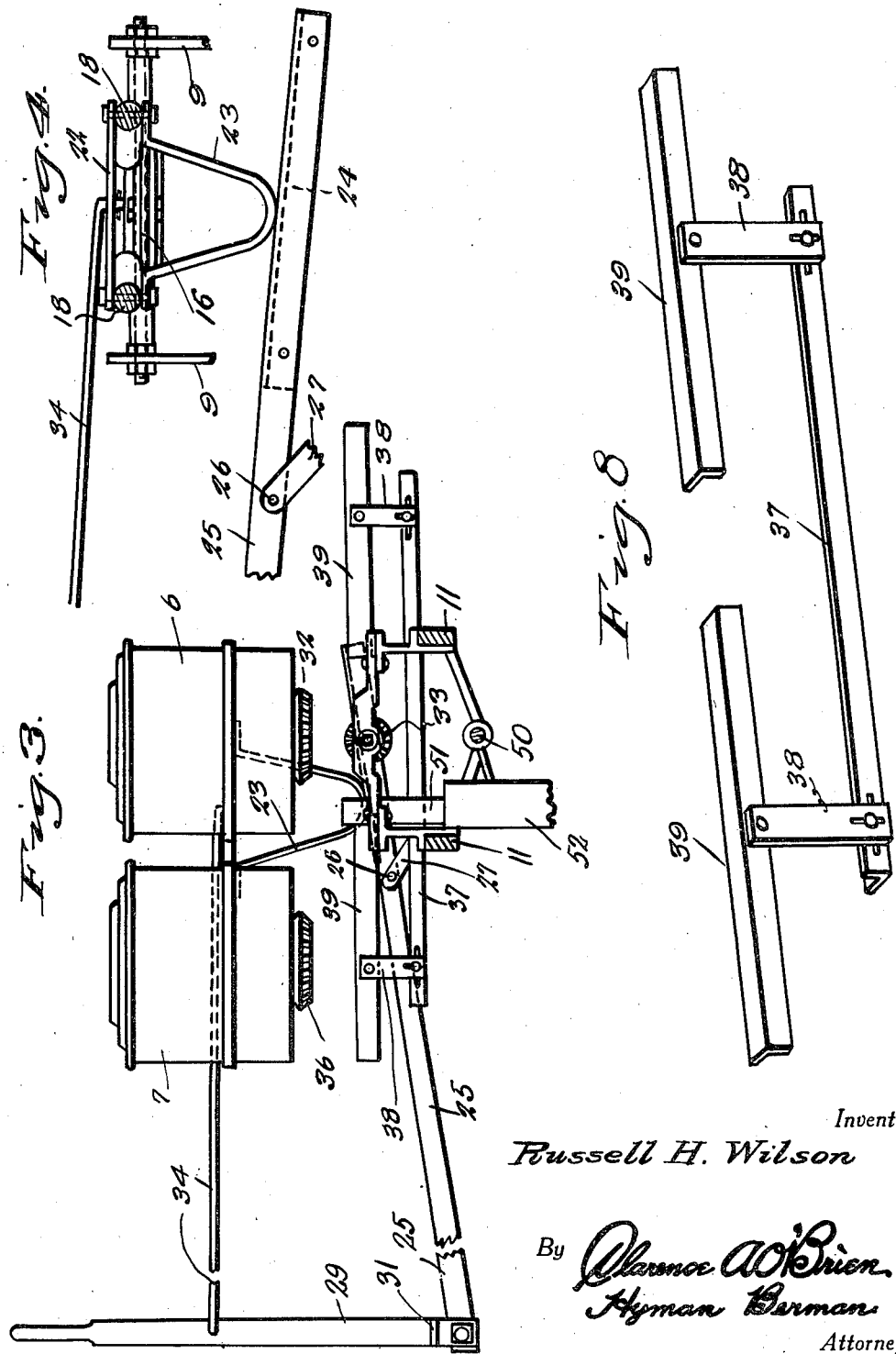

Patented Feb. 11, 1941

2,231,608

UNITED STATES PATENT OFFICE 2,231,608

PLANTER

Russell H. Wilson, Melba, Idaho

Application July 2, 1938, Serial No. 217,260

4 Claims. (Cl. 111—1)

This invention appertains to new and useful improvements in planting machines. The principal object of the present invention is to provide a planting machine especially adapted for planting hybrid corn wherein boxes for different strains of seed are mounted in such a manner that one or the other can be conveniently shifted into planting position.

With the present invention, the object is to merely change from one seed box to another by moving the boxes as a unit from one position to another.

Other important objects and advantages of the invention will become apparent to the reader of the following specification.

In the drawings:

Figure 1 represents a top plan view of the improved planter.

Figure 2 is a sectional view on the line 2—2 of Figure 1.

Figure 3 is a sectional view also substantially on the line 2—2 of Figure 1 but showing the seed boxes raised for shifting and fragmentarily showing the control means for shifting the boxes.

Figure 4 is a sectional view on the line 4—4 of Figure 1.

Figure 5 is a sectional view (enlarged) taken substantially on the line 5—5 of Figure 1.

Figure 6 is a sectional view taken substantially on the line 6—6 of Figure 1.

Figure 7 is a fragmentary perspective view of the control means.

Figure 8 is a perspective view of the rest assembly.

Figure 9 is a sectional view showing the control beam supporting means.

Referring to the drawings wherein like numerals designate like parts, it can be seen that numeral 5 represents the frame of the planter. Numeral 6 represents the seed box for the one strain of seed while numeral 7 denotes another box for the other strain of seed.

Numeral 8 represents the box containing the strain of seed most frequently used.

Upstanding members 9—9 are clamped as at 10 to the transverse seed box supporting frame 11 and a tie rod 12 extends between the upper ends of these members 9, the ends of this tie rod 12 being equipped with nuts 13 to secure the tie rod in place.

A plate 14 is bent to form a barrel-like portion over the tie rod 12 and a sleeve 15 on the rod 12, as is shown in Figure 5, with the edge portions of this plate 14 extending to overlap a plate 16. The plate 16 has an opening therein through which a pivot pin 17, in the form of a bolt, is disposed. A pair of diverging arms 18—18 are secured as at 19 to the plate 16 and support the rings 20—21, respectively, which rings are for holding the aforementioned seed boxes 7 and 6, respectively.

The arms 18—18 are bridged by the bridge member 22 and directly under this is the U-shaped rider 23 which has its upper end secured to the arms 18—18, this rider being adapted to ride on the flanged end portion 24 of the elongated rockable bar 25 which is rockably supported as at 26 on the bracket 27 which is secured as at 28 to the frame 5. (See Figure 9.)

Numeral 29 represents the hand lever the lower end of which is secured as at 30 to the rear end of the control bar 25 at which point the foot plate 31 is secured.

When it is desired to move the seed box 7 into the position of the seed box 6, the operator depresses the rear end of the control bar 25. The flanged end 24 of the bar 25 lifts the arms 18—18 and the seed boxes so that the bevel gear 32 of the seed box 6 is removed from the drive gear 33. By pushing forwardly on the hand lever 29, the rod 34 (see Figure 8) which extends from the hand bar 29 to have one end disposed into the opening 35 of the bridge member 22 will shift the assembly, with the plate 16 swinging on its pivot 17 until the seed box 7 is in the position ordinarily ocupied by the seed box 6, whereupon pressure is taken off of the foot piece 31 so that the seed box 7 can lower and have its bevel gear 36 in mesh with the drive gear 33.

An angle bar 37 has adjustably connected thereto upstanding members 38—38 for supporting angular rest members 39 in horizontal position at their upper ends. These members 39—39 serve as rests for the inactive seed box.

Numeral 50 denotes the usual check shaft for the purpose of operating the usual seed releasing mechanism. The check shaft is adapted to be actuated by the usual check means (not shown).

As shown in Figures 2 and 3, numeral 51 denotes a tube on the frame of the machine for receiving seed from the overlying box, this tube registering with the usual seed discharge chute 52.

Having described the invention, what is claimed as new is:

1. An attachment for planting seed of different strains for a planter having a single drive means, said attachment comprising a pair of seed receptacles, a swingable carrier for the receptacles, and means for optionally shifting the carrier to set one or the other of the receptacles in driven relation with respect to the single drive means.

2. An attachment for planting seed of different strains for a planter having a single drive means, said attachment comprising a pair of seed receptacles, a swingable carrier for the receptacles, and means for optionally shifting the carrier to set one or the other of the receptacles in driven relation with respect to the single drive means, said carrier consisting of a swingably mounted plate and a pair of arms disposed therefrom in diverging relation and adapted at their outer ends to support the said receptacles.

3. A planter attachment for planting seed of different strains for a planter having a single drive means, said attachment comprising a pair of seed containing receptacles adapted to be moved as a unit from one position to another, dispensing means for each receptacle including a gear, and a shifter for shifting the receptacles as a unit into driven position with respect to the single drive means in which position the drive means engages the gear of one of the said receptacles.

4. A planter attachment for planting seed of different strains for a planter having a single drive means, said attachment comprising a pair of seed containing receptacles adapted to be moved as a unit from one position to another, dispensing means for each receptacle including a gear, and a shifter for shifting the receptacle as a unit into driven position with respect to the single drive means in which position the drive means engages the gear of one of the said receptacles, said shifter including means for raising and lowering the said receptacles as connections are made or broken with respect to the gears and single drive means.

RUSSELL H. WILSON.